(No Model.)
J. AULD.
TRICYCLE.
No. 289,746. Patented Dec. 4, 1883.
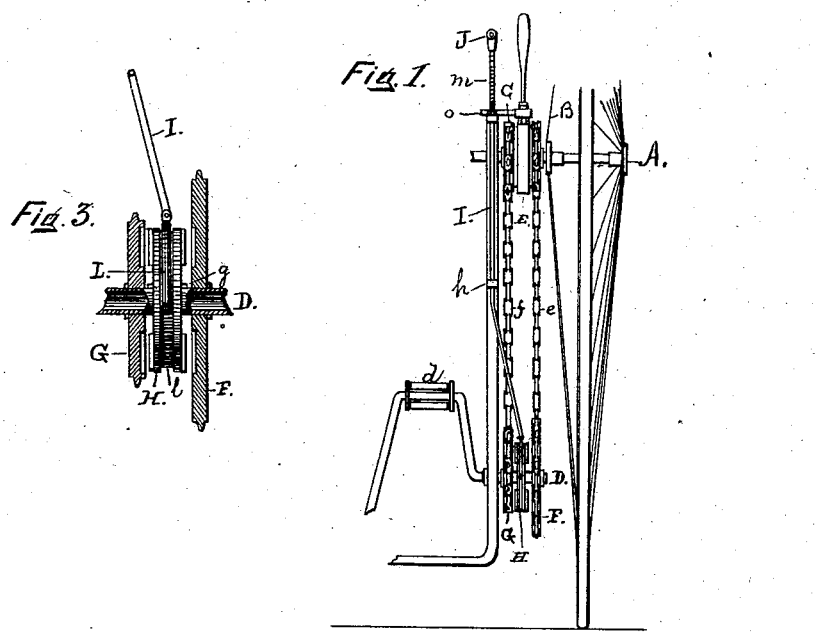
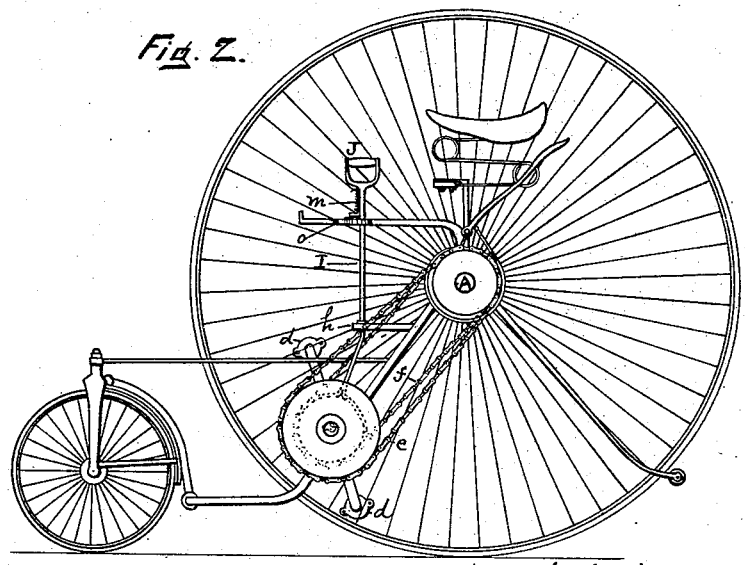
Witnesses:
James A. Harvey
W. L. Burnap
Inventor:
Joseph Auld
per Charles E. Allen
Atty.

UNITED STATES PATENT OFFICE.

JOSEPH AULD, OF BURLINGTON, VERMONT.

TRICYCLE.

SPECIFICATION forming part of Letters Patent No. 289,746, dated December 4, 1883.

Application filed August 30, 1883. (No model.)

*To all whom it may concern:*

Be it known that I, JOSEPH AULD, a citizen of the United States, residing at Burlington, in the county of Chittenden and State of Vermont, have invented certain new and useful Improvements in Tricycles, of which the following is a specification, reference being had therein to the accompanying drawings.

This invention relates to an improvement in tricycles, the object being to provide suitable driving mechanism, simple in its construction, compact in its arrangement, and convenient and reliable in its operation, by which the speed may be varied according to the nature or character of the road over which it is propelled; and it consists in the construction and combination of parts, as will be hereinafter described and claimed.

In the accompanying drawings, in which similar letters of reference indicate like parts, Figure 1 is an elevation of a portion of a tricycle, showing the application of my invention. Fig. 2 is a side elevation of the same. Fig. 3 is a view, partly in section and partly in elevation, of the two lower chain-wheels, the bevel-gear pinion which controls the movement of each, a portion of the axle of the driving-wheel, and of the lever which slides the pinion on the axle of the crank-shaft.

A is the axle of the usual driving-wheels of a tricycle. In addition to the chain-wheel B upon the axle A, which is generally employed to transmit motion from the ordinary pedal or crank-shaft, D, with its customary pedals, $d$ $d$, I employ a second chain-wheel, C, similar to B, and separated from the latter by the intervening brake-pulley E. Both of these wheels are rigidly secured to the shaft A, and are respectively connected by endless chains $e$ and $f$ to the chain-wheels F and G, which are of different diameters, and are loosely hung on the pedal or crank-shaft D between fixed collars, to prevent lateral movement.

H is a pinion attached to the axle D by the key $g$, so that it shall always rotate with it. It is so arranged that it can be moved laterally upon the axle by means of the lever I, which is pivoted at $h$. On each side of the pinion H is a bevel-gearing, which is designed to engage with corresponding bevel-gearing on the sides of the chain-wheels F and G, adjacent to it. On the upper extremity of the lever I is a handle, J, while the lower end terminates in a fork, the prongs L of which lie in an annular groove, $l$, of the pinion H. Thus constructed, a side movement of the handle J of the lever I moves the pinion H longitudinally upon the axle D until it engages with either wheel F or G, as preferred, thereby forcing that wheel to rotate with the axle D, and impart motion to the axle A. If no power is required to be exerted—as, for instance, when the tricycle is running over descending ground—then by a slight movement of the handle J the pinion H is made to occupy an intermediate position, as shown in Figs. 1 and 3, between the chain-wheels F and G, and disconnected from both, thus allowing them to hang loosely upon the axle D, while the pedals $d$, which remain stationary, will serve simply as foot-rests. The three positions to be occupied by the handle J, as described, can be readily held by means of the spring finger-bolt $m$ on the handle, with holes in the supporting-rod $o$ at proper distances. If, for example, the diameters of each of the chain-wheels B and C are seven inches and those of the chain-wheels F and G are nine and five inches, respectively, it is apparent that when motion is imparted to the axle A through the connection of the pinion H with the wheel F the tricycle will be geared for speed—that is, it will be propelled over level ground with the greatest rapidity—as the speed of the pedal-shaft D is less than that of the axle A. It will be geared for power required to propel the tricycle up ascending ground or over heavy roads, when motion is imparted to the axle A through the chain-wheel G, by simply reversing the lever I and bringing the pinion H into contact with it, as the speed of the pedal-shaft D will then be greater than that of the axle A. The diameters of the several chain-wheels may be changed, provided their respective relation to each other required by the different speeds are maintained.

By thus locating the speed attachment on one side of the tricycle and employing simple, compact mechanism which is easily and instantly controlled by a single shipping-lever most convenient to the hand of the rider and directly under his observation, it is free from many of the practical inconveniences and objections to which other more complicated and inconvenient speed devices are liable.

Having thus described my invention, what I claim, and desire to secure by Letters Patent, is—

In a tricycle, the combination of the axle A, having the two wheels B C, of equal size, secured thereto, and the intervening brake-pulley E, with the chains $e f$, pedal-shaft D, having the two wheels F G, of unequal diameter, secured thereto, a clutch-pinion, H, and the lever I, whereby the pinion can be shifted back and forth and the tricycle be geared for either power or speed, as may be desired, substantially as shown and described.

In testimony whereof I do affix my signature in presence of two witnesses.

JOSEPH AULD.

Witnesses:
   EDWARD JOHNSON,
   CHARLES E. ALLEN.